US 8,402,886 B2

(12) United States Patent
Herren

(10) Patent No.: US 8,402,886 B2
(45) Date of Patent: Mar. 26, 2013

(54) DEVICE FOR PROCESSING FOODSTUFFS

(75) Inventor: Bruno Herren, Beckenried (CH)

(73) Assignee: Swizzzprozzz AG (CH)

(*) Notice: Subject to any disclaimer, the term of this patent is extended or adjusted under 35 U.S.C. 154(b) by 615 days.

(21) Appl. No.: 12/299,445

(22) PCT Filed: May 3, 2007

(86) PCT No.: PCT/CH2007/000218
§ 371 (c)(1),
(2), (4) Date: Nov. 3, 2008

(87) PCT Pub. No.: WO2007/128154
PCT Pub. Date: Nov. 15, 2007

(65) Prior Publication Data
US 2009/0178580 A1   Jul. 16, 2009

(30) Foreign Application Priority Data

May 4, 2006 (CH) .......................... 730/06
Jan. 22, 2007 (CH) ........................... 89/07

(51) Int. Cl.
*A47J 43/04* (2006.01)
*A47J 43/08* (2006.01)

(52) U.S. Cl. ...... 99/510; 99/537; 241/101.1; 241/169.1; 241/199.12; 241/277; 241/282; 241/282.2; 241/292.1

(58) Field of Classification Search .............. 99/510, 99/537; 241/169.1, 101.1, 199.12, 277, 282, 241/282.2, 292.1
See application file for complete search history.

(56) References Cited

U.S. PATENT DOCUMENTS 3,156,278 A * 11/1964 Otto ........................... 241/282.2
3,741,104 A *  6/1973 Kannegiesser .................. 99/495
(Continued)

FOREIGN PATENT DOCUMENTS

CN    2239768      11/1996
EP    0 345 223    5/1999
(Continued)

OTHER PUBLICATIONS

International Search Report dated Sep. 14, 2007, issued in corresponding international application No. PCT/CH2007/000218.

*Primary Examiner* — Gene Kim
*Assistant Examiner* — Alexander Niconovich
(74) *Attorney, Agent, or Firm* — Ostrolenk Faber LLP

(57) ABSTRACT

A device for processing foodstuffs in accordance with an embodiment of the present disclosure includes an upper part, a drive mechanism and a lower part with a working container, in which a working unit can be manually driven and made to rotate by means of the drive mechanism. The drive mechanism includes a tractive cable drive and is operatively connected to the working unit by means of a releasable torque-coupled connection. The drive mechanism also includes a primary and secondary drive unit, which are operatively interconnected by means of a gear in such a way that a transmission ratio of between 1:1.5 and 1:4 and preferably between 1:1.8 and 1:1.9 is achieved. The primary and secondary drive units are axially parallel and dimensioned in such a way that at least one of the drive units intersects the rotational axis of the other respective drive unit. Despite the transmission ratio achieved, the dimensions of the drive mechanism can be kept small, allowing said mechanism to be housed without any problems in the upper part. The non-employment of two continuous axes, the eccentric arrangement of the drive wheel axis and the use of a drive wheel with inner gearing allow an axial wheel for indirectly driving the drive unit to be mounted on the central axis of the device in a preferred embodiment and the transmission to be achieved by the larger drive wheel, without causing the space required in the upper part next to the axial pin to increase by the diameter of the drive wheel.

10 Claims, 7 Drawing Sheets

U.S. PATENT DOCUMENTS

| | | | | |
|---|---|---|---|---|
| 3,892,365 A * | 7/1975 | Verdun | | 241/92 |
| 4,127,342 A * | 11/1978 | Coggiola | | 403/243 |
| 4,209,916 A * | 7/1980 | Doyel | | 34/58 |
| 4,878,627 A * | 11/1989 | Otto | | 241/199.12 |
| 5,156,084 A * | 10/1992 | Lin | | 99/495 |
| 5,577,675 A * | 11/1996 | Ishikawa | | 241/65 |
| 5,782,416 A * | 7/1998 | Nejatbina | | 241/194 |
| 6,035,771 A * | 3/2000 | Conran et al. | | 99/510 |
| 6,299,085 B1 * | 10/2001 | Ekstrom | | 241/282.1 |
| 6,467,711 B2 * | 10/2002 | Michel | | 241/169 |
| 6,510,785 B1 * | 1/2003 | Margolin | | 99/495 |
| 6,805,312 B2 * | 10/2004 | Capp | | 241/36 |
| 7,059,553 B2 * | 6/2006 | Mueller | | 241/199.12 |
| 7,264,189 B2 * | 9/2007 | Holcomb et al. | | 241/101.1 |
| 7,422,169 B2 * | 9/2008 | Mueller | | 241/168 |
| 7,669,793 B2 * | 3/2010 | So et al. | | 241/169.1 |
| 7,673,829 B2 * | 3/2010 | Holcomb et al. | | 241/292.1 |
| 7,762,487 B2 * | 7/2010 | Cheung | | 241/169.1 |
| 7,905,438 B2 * | 3/2011 | Holcomb et al. | | 241/292.1 |
| 7,954,744 B2 * | 6/2011 | Jossem et al. | | 241/169.1 |
| 7,975,605 B2 * | 7/2011 | Wan et al. | | 99/495 |
| 2002/0027175 A1 * | 3/2002 | Capp | | 241/199.12 |
| 2002/0153440 A1 * | 10/2002 | Holcomb et al. | | 241/169.1 |
| 2006/0169810 A1 * | 8/2006 | Holcomb et al. | | 241/169.1 |
| 2008/0163768 A1 * | 7/2008 | Glucksman et al. | | 99/537 |
| 2008/0188365 A1 * | 8/2008 | Dalla Piazza et al. | | 494/84 |
| 2009/0090254 A1 * | 4/2009 | Herren | | 99/537 |
| 2009/0320696 A1 * | 12/2009 | Herren | | 99/493 |
| 2010/0170404 A1 * | 7/2010 | Hensel et al. | | 99/537 |

FOREIGN PATENT DOCUMENTS

| | | |
|---|---|---|
| WO | 03043477 | 5/2003 |
| WO | WO 03/043477 | 5/2003 |
| WO | WO 03/043477 A1 | 5/2003 |
| WO | 2004073474 | 9/2004 |
| WO | WO 2004/073474 | 9/2004 |
| WO | WO 2004/073474 A1 | 9/2004 |
| WO | 2005115209 | 12/2005 |
| WO | WO 2005/115209 | 12/2005 |
| WO | WO 2005/115209 A1 | 12/2005 |

* cited by examiner

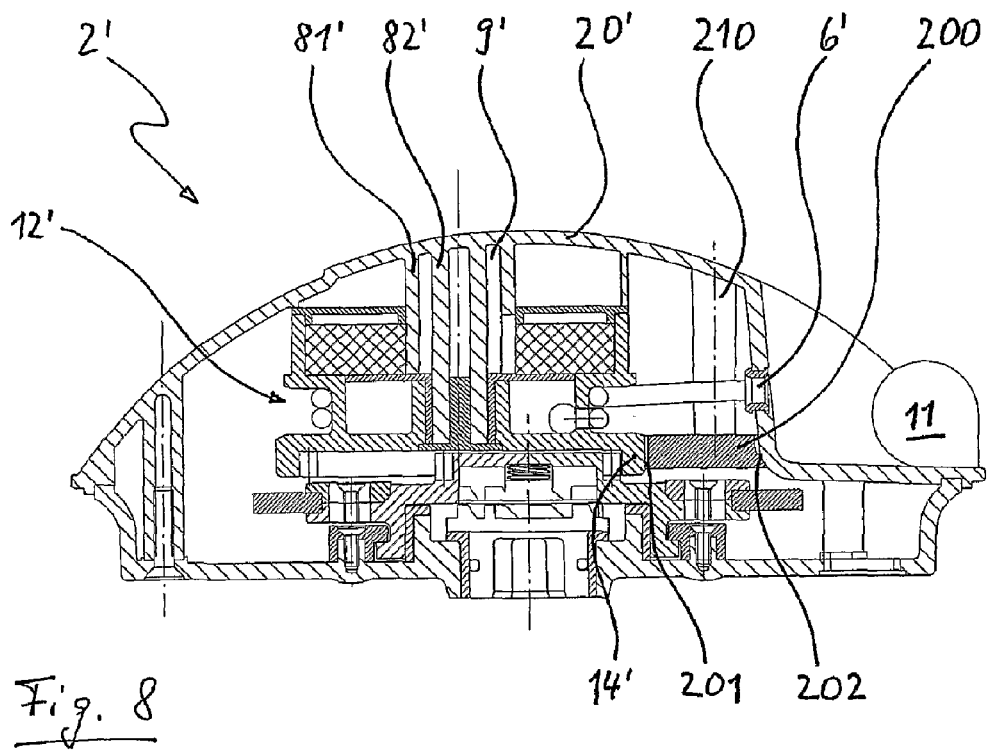
Fig. 8
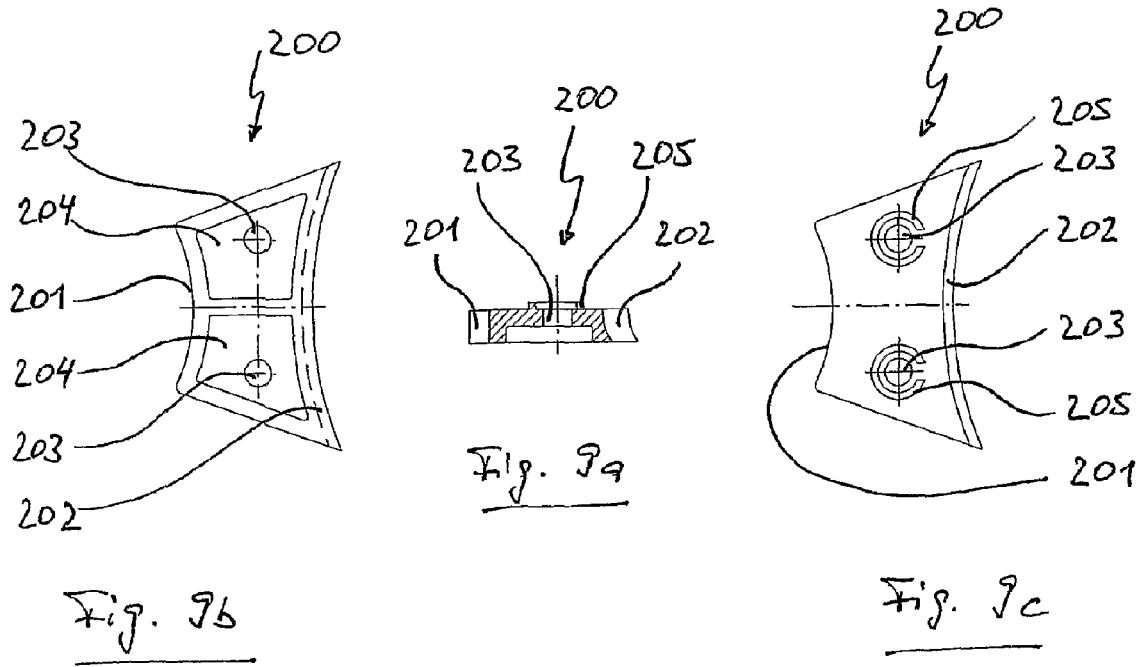
Fig. 9b
Fig. 9a
Fig. 9c

DEVICE FOR PROCESSING FOODSTUFFS

CROSS REFERENCE TO RELATED APPLICATIONS

The present application is a 35 U.S.C. §371 National Phase conversion of PCT/CH2007/000218, filed May 3, 2007, which claims benefit of Swiss Application No. 730/06, filed May 4, 2006, and Swiss Application No. 89/07, filed Jan. 22, 2007, the disclosures of which are incorporated herein by reference. The PCT International Application was published in the German language.

FIELD OF THE INVENTION

Choppers for comminuting foodstuffs, in particular for chopping onions, are known for example from U.S. Pat. No. 6,467,711 or EP-B-0 345 223, which have a housing which can be inverted over the material to be comminuted and have a cutter, which is guided inside the housing and can be displaced against the force of a spring by means of an actuating mechanism with a pushbutton and a plunger. The cutter can be downwardly displaced against the force of the spring and, in the course of the subsequent upward movement, is rotated over a defined angle in relation to the housing by a guidance device in the housing. A stepping mechanism arranged between the actuating mechanism and the housing makes sure that a forced stepping of the cutter is assured. This forced stepping mechanism has been shown to be very advantageous, because it prevents the cutter from "chopping in place". The effectiveness of the chopper is increased by this and the evenly sized distribution of the processed material is improved. The devices are widely distributed, however, they have some disadvantages. For example, for processing hard vegetables it is necessary to hit the pushbutton with great force. Fibrous vegetables, such as fennel or leeks, can be processed only poorly or not at all, and in connection with fine materials to be cut, the results are rather unsatisfactory.

Devices driven by a crank drive mechanism for processing vegetables have been known for years, such as the device in U.S. Pat. No. 6,035,771, for example, in which two blades, which project at right angles in two opposite directions, are arranged on a central shaft which extends perpendicularly into a nearly circular-cylindrical container for material to be cut. The blades are each provided with a cutting edge only at the front edge, so that the crank must always be turned in a clockwise direction. The crank acts on a drive unit, which is arranged eccentrically in respect to the central shaft. The rotating movement of the crank-operated driveshaft is transmitted via a first gear wheel with teeth on the exterior to a second gear wheel of the central, cutter-supporting shaft. To achieve a higher number of revolutions of the shaft, further gearing is provided in accordance with an embodiment by means of two further drive wheels. This double gearing does not only increase costs during production, but also makes the device louder and more prone to malfunction.

A small, approximately cylindrical, manually operated device is known from WO 2004/073474, which is hand-held for operation. A central shaft, arranged on the common center axis, with two blades, which project at right angles in opposite directions, is driven by means of the repeated rotation of a circular drive mechanism in relation to the coaxially arranged container with the material to be processed. Since for operating it the device must be almost completely enclosed by the hands of the user, the structural size is extremely limited. The material to be processed—for example an onion—must be cut into quarters for filling, since otherwise there is no room for it in the container for the material to be processed. For achieving a satisfactory processing result it is necessary to rotate the drive element 40 to 60 times alternatingly in opposite directions in relation to the remaining parts of the device. The rotary movement of the drive unit in respect to the container is transferred in a geared manner to the shaft with the cutters. Since the blades are provided with cutting edges on both sides, it is possible to cut in both directions by a directed reversal of the turning direction of the shaft. The device has the additional disadvantage that, when being filled with hard or fibrous materials to be processed—because of the gearing of the rotating movement—, the drive unit must be rotated with great force in respect to the container. Since the users often have wet or greasy hands, particularly when cooking, the device cannot be safely held in such a situation, or the user slides off it and cannot provide the force necessary for cutting. It is obvious to one skilled in the art that the manufacture and mounting of the planetary gear is very costly.

A further small manual device is known from EP 1 385 409, in which a cutter-supporting shaft can be pushed directly onto a driven shaft. The shaft is provided with four radially projecting blades, which are arranged spaced apart at approximately right angles in respect to each other. Operation of the shaft takes place by means of a cord pull, wherein the winder for the cord pull is coaxially seated on the driven shaft and is therefore also arranged coaxially to the cutter-supporting shaft. When operated, the device is freely held in the one hand and the cord pull must be pulled with the other hand. Again, only a small amount of material to be processed, which must be cut into pieces prior to processing, can be filled in between the blades and under the shaft supporting the blades and projecting freely into the container for the material to be cut. If too much or too large-sized material to be processed is filled into the container for the material to be processed, blockage of the device can occur when pulling on the cord pull, because all four blades cut simultaneously. Although the lever effect is increased by selecting a winder with a large diameter, the number of revolutions which can be simultaneously achieved is reduced.

BACKGROUND OF THE INVENTION

The invention is based on the object of making available a device in accordance with the species which does not have the above mentioned disadvantages. It is a further object to make available a manual drive mechanism which permits the user to easily transfer sufficient force to the cutters and simultaneously to reach a large number of revolutions, respectively a high cutting speed, in order to be able to also process increased amounts of material difficult to process, such as, for example, hard, fibrous and/or wet material to be processed, without problems. Moreover, manufacture and assembly of the device should be cost-efficient and the device should suitable to be used for further processing steps of foodstuffs, besides cutting or chopping, and should generally be simple, safe and easy to operate and clean with little effort.

This object is attained by means of a device having the characteristics of claim 1.

A device for processing foodstuffs substantially consists of a top part, a drive mechanism, a lower part with a processing container, as well as a processing unit, which can be manually driven by means of the drive unit and put into a rotating motion. The drive mechanism can be operated by means of a cord pull drive, and the drive mechanism and the processing unit are in an operative connection via a releasable torque-proof connection. The drive mechanism substantially comprises a primary and a secondary drive unit, which are in an operative connection via gears in such a way that a transmission ratio, preferably of 1:1.5 to 1:4, is achieved, particularly preferred of between 1:1.8 and 1:1.9. In one embodiment, the primary and secondary drive units are arranged axis-parallel in relation to each other. It is furthermore possible that the secondary drive unit is arranged coaxially in relation to a central axis of the device, and a driveshaft of the primary drive unit eccentrically thereto. Furthermore, at least one of the drive units intersects the axis of the respectively other drive unit. In a further form of embodiment, the primary drive unit comprises, coaxially arranged, a spring housing, winder and drive wheel, and the secondary drive unit comprises, coaxially arranged, an axial journal, rotor disk and bearing bushing. In a special embodiment, the primary drive unit is in operative connection via an internal tooth arrangement of the drive wheel with a external tooth arrangement of the axial journal of the secondary drive unit. One option consists in that a bearing journal, which extends freely downward from an underside of the cover supports the primary drive unit. Furthermore, the primary drive unit can be arranged approximately horizontally in the top part and can be supported against the interior cover wall in this position. In a preferred embodiment the axial journal and the rotor disk have a central hexagonal receptacle on the underside for receiving an axially displaceable upper coupling element in torque-proof connection, which can be brought out of an upper free-wheeling position into a lower torque-proof engagement position with a lower engagement member for transmitting the rotary movement of the drive mechanism to the processing unit. In a further form of embodiment, the processing container is a substantially rotation-symmetrical vessel for receiving material to be processed, in which the drive unit is preferably arranged radially in respect to the central axis. In a preferred form of embodiment, the support element supports the primary drive unit, and partially absorbs the deflection force introduced by the swinging movement into the winder and the bearing journal.

BRIEF DESCRIPTION OF THE DRAWINGS

The invention will be explained in what follows by means of drawing figures, which merely represent exemplary embodiments. Shown are in:

FIG. 1, a longitudinal sectional view along the central axis through the device in accordance with a first embodiment, in which a cutting unit is not represented in section, FIG. 2, a sectional view through a top part of a device in accordance with FIG. 1, FIG. 3, an enlarged detail of selected portions of the drive mechanism in the state installed in the top part in accordance with FIG. 2, FIG. 4, an enlarged detail of selected portions of the drive mechanism in FIG. 3 in the disassembled state, in which they are pushed apart in the axial direction, FIG. 5, in a longitudinal sectional view a lateral view of a generator unit installed in a top part in accordance with FIG. 1, FIG. 6, a view from above on a cover of a device in accordance with FIG. 1, FIG. 7a, a longitudinal sectional view through a coupling with a single direction free-wheeling device between a secondary drive unit and a base, FIG. 7b, a view from below on an upper coupling element in the direction B, in accordance with FIG. 7a, FIG. 7c, a view from above on an engagement member of a coupling in accordance with FIG. 7a in a direction of view A, FIG. 8, a sectional view through a top part in accordance with a further embodiment, FIG. 9a, a sectional view through a support element in accordance with the embodiment of FIG. 8, FIG. 9b, a view from below on the support element in accordance with FIG. 9a, and FIG. 9c, a view from above on the support element in accordance with FIG. 9a.

DETAILED DESCRIPTION OF THE PREFERRED EMBODIMENTS

Figure 1:
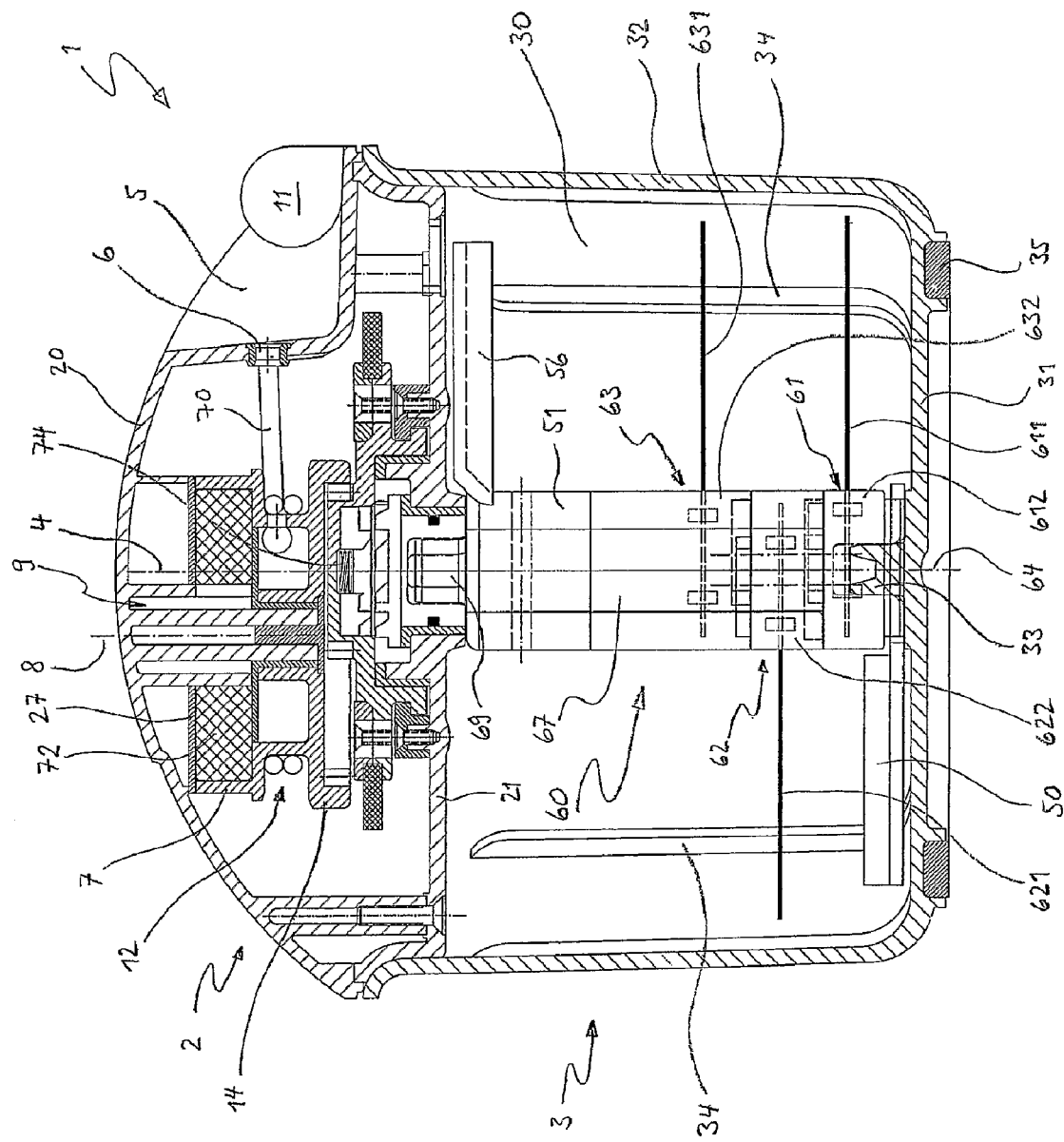

A first embodiment of the device 1 for processing foodstuffs in accordance with the invention is represented in axial longitudinal section in FIG. 1, in which a cutting unit 60 is not shown in section. The device 1 is embodied substantially rotation-symmetrical around a central shaft and has a top part 2, which is comprised of a circular, substantially flat base 21 with a curved cover 20 placed on it. Essential parts of a drive mechanism 10 are housed between the cover 20 and the base 21. The top part 2 can be placed in a positive and/or non-positive manner on a lower part 3 which, in the present case, comprises a circular, bowl-shaped container 30 for material to be cut. The container 30 for material to be cut is preferably made of a transparent or semi-transparent plastic material approved for foodstuffs and includes a bottom 31 with a centered, upward oriented bearing pin 33 and a lateral wall 32 with a plurality of vertical swirling ribs 34, evenly distributed over the circumference. On its underside the cutting unit 60 is provided with a central bearing opening, by means of which it can be plugged onto the bearing pin 33 in the container 30 for material to be cut. The cutting unit 60 in accordance with the represented embodiment is substantially constituted by a cutter shaft 67 as the operative means, from which three blades 61, 62, 63, and two deflectors 50, 51 protrude. A drive cam 69, in the exemplary embodiment a cam with a hexagonal exterior, at the top of the cutting unit 60 engages a corresponding receptacle 71 of an engagement member 23 of the drive unit in positive manner, so that the torque can be transferred from the engagement member 23 of the drive mechanism 10 to the cutting unit 60. The engagement member 23 is seated, rotatable but axially not displaceable, under low friction and sealed against the base 21, in the center of the base 21. In this way the cutter shaft 67 with the operative means 50, 51, 61, 62, 63 is securely seated at the top and bottom and can absorb forces introduced in the course of the operation of the operative means, in the present case into the cutters 61, 62, 63 and the deflectors 50, 51, without problems, even at high numbers of revolutions, without being deflected from its axial position.

Figure 2:
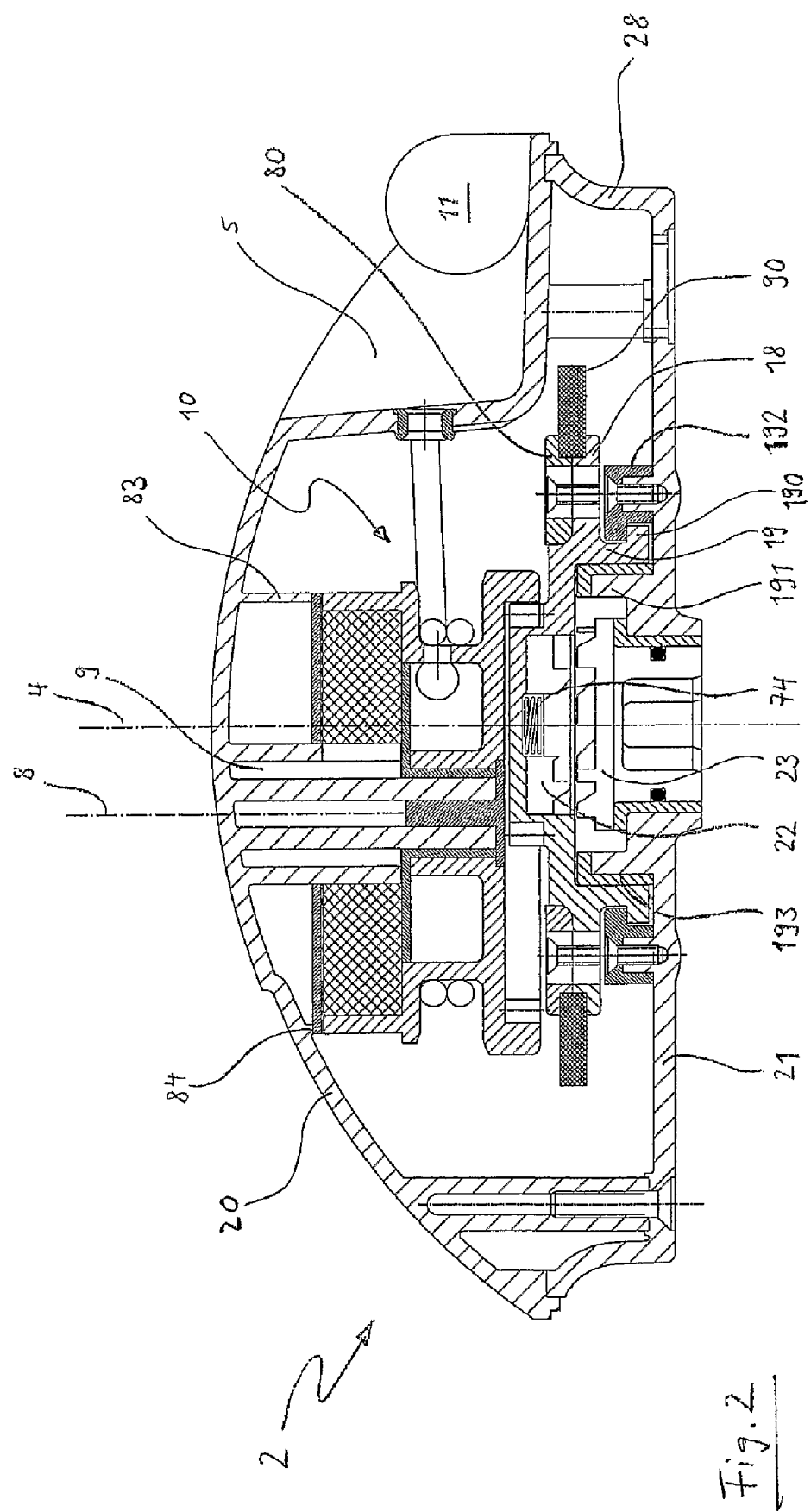
Figure 3:
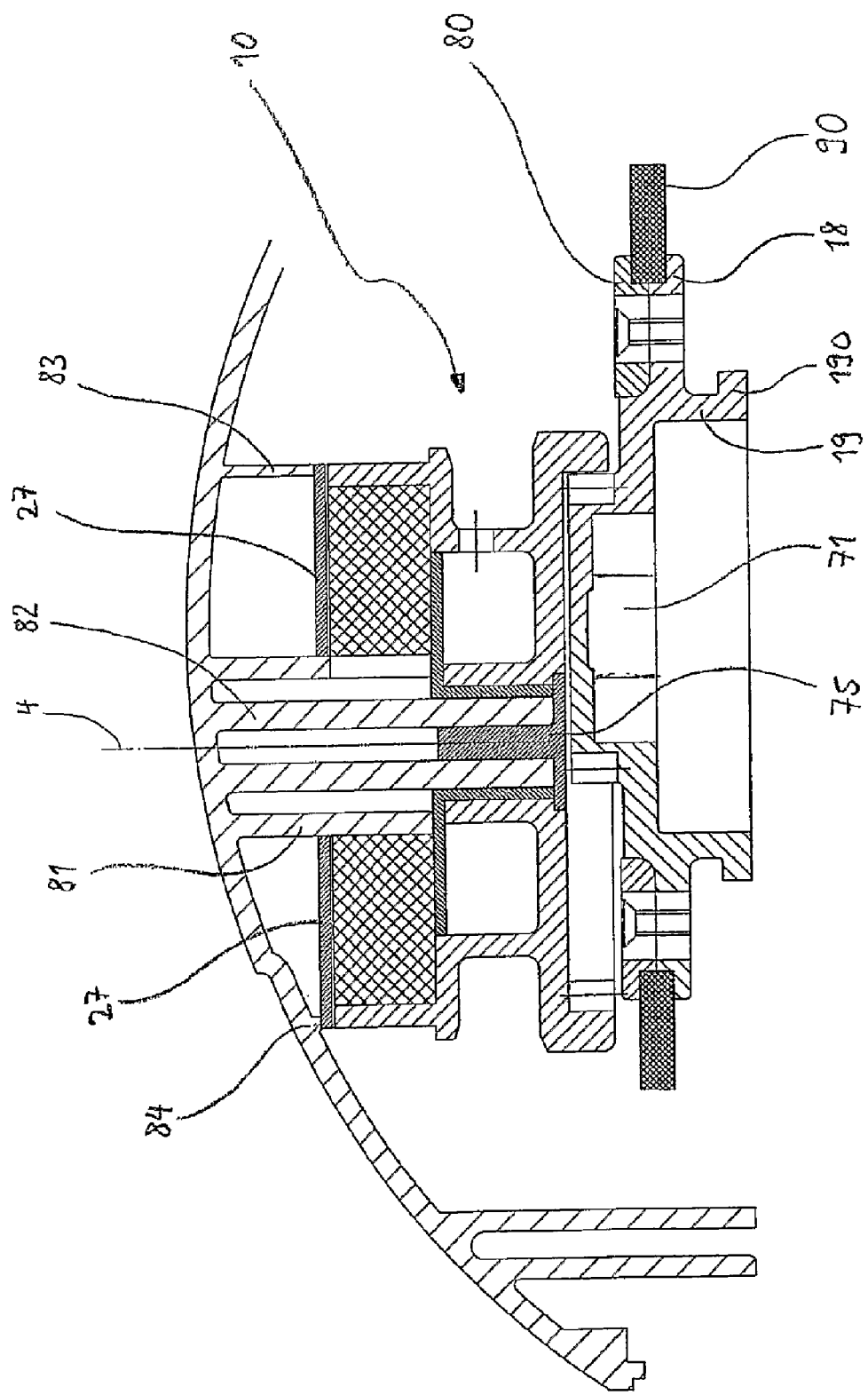
Figure 4:
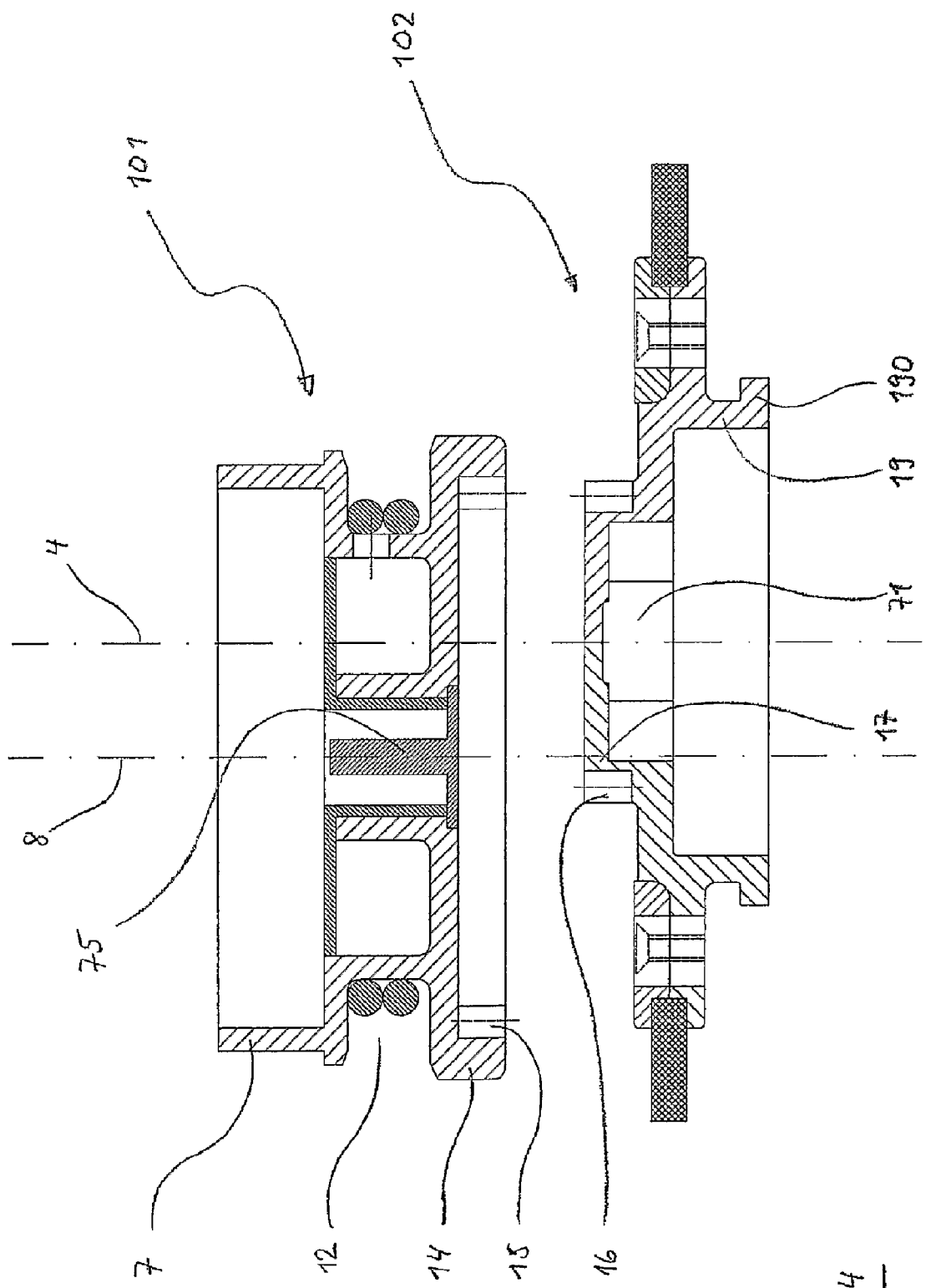

In accordance with the instant invention, the rotating movement of the operative means is generated by means of a pull cord mechanism. As represented in FIGS. 1 and 2, with the pull cord 70 wound up, the handle 11 comes to rest in the recess 5 in the cover 20. The pull cord 70 fastened to it is conducted under low friction through a feed-through opening 6 in the cover 20 to a winder or cord roller 12 attached to the interior of the top part 2 and is wound up thereon. A spring housing 7 is arranged concentrically in relation to the winder 12 on a bearing journal 9, which extends downward from the cover 20. The length of the pull cord 70 has been selected to be 400 to 750 mm, preferably 600 mm, in such a way that, with a corresponding diameter of the winder 12, the winder 12 rotates fully circumferentially 3 to 6 times, preferably 4 to 5 times, per pull on the pull cord 70 (until it is completely unwound). A device 1 with a drive mechanism 10 with a gear is represented in the exemplary embodiment of FIGS. 1 to 4, in which the driveshaft 8 is eccentrically arranged on the cover interior.

The winder 12 is preferably manufactured in one piece with a spring housing 7 located above it and a hollow wheel, also called drive wheel 14, located below it and substantially constitutes a primary drive unit 101. The drive wheel 14, arranged eccentrically to the central shaft 4, is open toward the bottom and is provided with an internal tooth 15 arrangement. The internal tooth arrangement 15 is only suggested in each of FIGS. 1 to 4. They are in operative connection with the external tooth arrangement 16 of an axial journal 17, which is seated concentrically in respect to the central shaft 4 on the top part 2. The gear ratio in the exemplary embodiment represented is 1:1.8, and a gear ratio of 1:1.5 up to 1:4 has proven itself to be advantageous.

The axial journal 17 is a part of a secondary drive unit 102, comprised of the axial journal 17, rotor disk 18 and bearing bushing 19, and whose axis of rotation coincides with the central shaft 4 of the device 1. The axial journal 17 is concentrically seated on a rotor disk 18, which comprises clamping means for receiving a magnetic ring 90. In the exemplary embodiment represented, the clamping means are comprised of a peripheral groove. An interior area of the magnetic ring 90 is clampingly held by means of a clamping ring 80 in the peripheral groove of the rotor disk 18, so that a larger portion of the diameter of the magnetic ring freely projects outward in the radial direction. The function of the magnetic ring will be explained in greater detail later.

A cylindrical bearing bushing 19 projects downward from the underside of the rotor disk 18 and is provided with a lower flange 190 extending around the outside. The secondary drive unit 102 is seated with the bearing bushing 19 on a shaft cylinder 191 of the base 21. A plurality of hold-down devices 192, distributed over the exterior circumference of the bearing bushing 19 and screwed together with the base 21, extends behind the flange 190 and assures that the secondary drive unit 102 cannot be released in the axial direction from the shaft cylinder 191, but without hampering its rotatability. As represented in FIGS. 1 and 2, a bearing sleeve 193 is pressed, or glued, onto the shaft cylinder 191 and provides more stability to the structure and minimizes wear. Highly stressed areas of the driveshaft 8 and of the bearing opening of the base 21 of the top part 2 are provided with corresponding bearing sleeves in the same way.

It can be clearly seen from the plan views in FIGS. 1 to 4 that the drive units 101, 102 do not have a common continuous shaft. The rotating shafts of the two substantial rotationally movable parts of the drive mechanism 10, the primary drive unit 101, comprising the spring housing 7, winder 12, and drive wheel 14, and of the secondary drive unit 102, comprising the axial journal 17, rotor disk 18 and bearing bushing 19, are arranged, spaced apart in an axis-parallel manner from each other, on the cover 12, or respectively the base 21. Since the axial journal 17 with the external tooth arrangement protrudes into the drive wheel 14 with the internal tooth arrangement, it is necessary for the shafts 4 and 8, on which the drive units 101, 102 have been seated in a rotationally movable manner, to be designed appropriately rugged in order to be able to absorb the forces introduced into the cord pull during hard pulling and to pass them on. The bearing journal 9, which is arranged on the cover and supports the winder 12, must be designed with sufficient ruggedness to assure that the engagement of the cooperating tooth arrangements 15, 16 of the drive wheel 14 and axial journal 17 is not released during pulling. The exploded view of the two drive units 101, 102 in FIG. 4 explains the position of the two shafts 4 and 8 and the dimensioning of the two gear portions, the drive wheel 14 with the internal tooth arrangement and the axial journal 17 with the matching external tooth arrangement. The gear in accordance with the invention can also be realized by other force transmitting means, for example wheels and rollers with a frictional connection.

A basic advantage of the device in accordance with the invention lies in that gearing from the drive wheel 14 to the axial journal 17 takes place without a change in the rotational direction. A further substantial advantage lies in that in spite of the achieved gearing the structural size of the drive mechanism 10 can be kept small, so that the drive mechanism 10 can be housed without problems in the top part 2. Making do without two continuous shafts, the eccentric arrangement of the driveshaft 8 and the use of the internal tooth arrangement of the drive wheel 14 make it possible to place the secondary drive unit 102 on the central shaft 4 of the device, and to simultaneously achieve the gearing by means of the larger drive wheel 14 without increasing the space required in the top part 2 laterally of the axial journal 17 by the diameter of the drive wheel 14.

In the exemplary embodiment represented, the bearing journal 9 is only fastened at an upper end at an underside of the cover and extends freely downward. Preferably the bearing journal 9 is constructed stepped in two parts, so that the spring housing 7 is seated around a thicker exterior hollow cylinder 81, and the winder 12 rotates around an interior hollow cylinder 82, which projects further downward from the concentric exterior hollow cylinder 81. A washer 27 closes off the spring housing 82, in which the restoring spring 72, not represented in detail, is located, toward the top. At its periphery, the washer 27 is supported at several locations directly, 84, or by means of several support elements 83, on the inside of the cover 20 and is maintained in a horizontal position in this way. From FIG. 3 it becomes clear that the primary drive unit 101 is plugged onto the hollow cylinders 81, 82 and is securely maintained by means of a plug 75 on the bearing journal 9 in a rotatably movable manner, but secure against axial displacement.

Figure 7B:
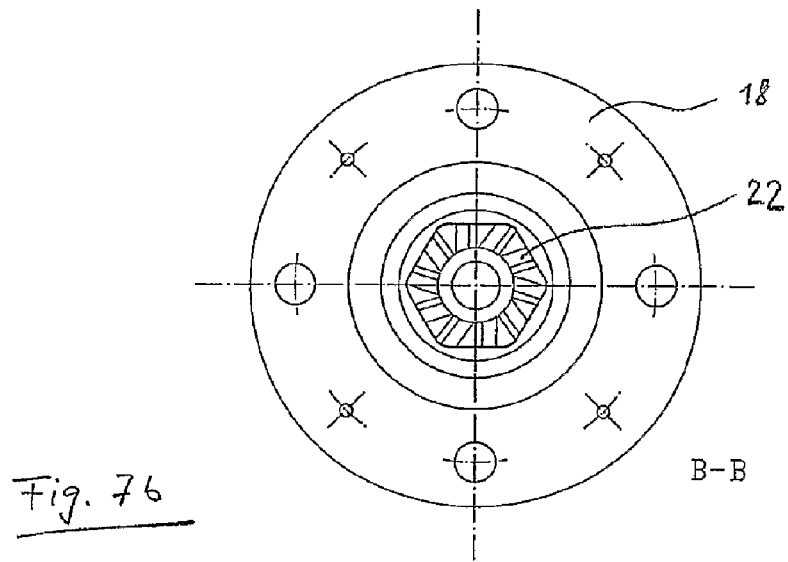
Figure 7A:
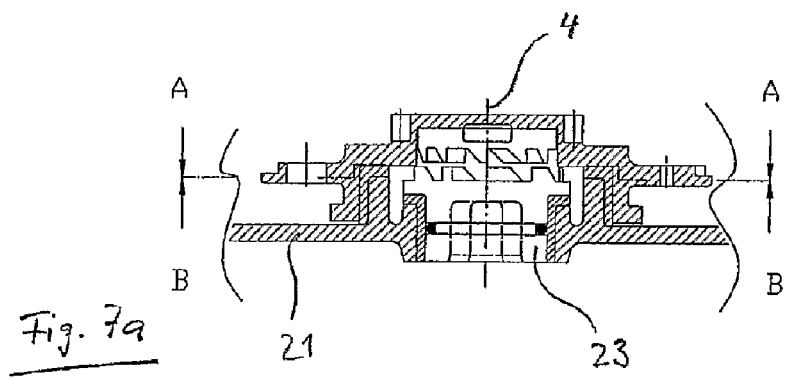
Figure 7C:
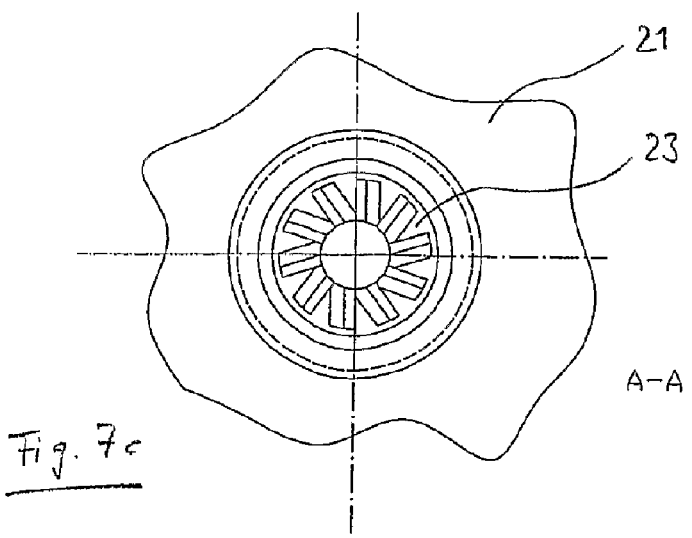

Function of the restoring spring 72 in connection with a cord pull mechanism is generally known and need not be further explained. The winder 12 is put into rotation by pulling on the cord pull, and the spring 72 is prestressed in the operating direction in the course of the rotation operation until the pull cord 70 is completely unwound, preferably after 3 to 6 revolutions of the winder 12. In the course of the rotation operation, the rotary movement of the winder 12 is transmitted in the same direction of rotation to the axial journal 17, and thereby of the secondary drive unit 102. The axial journal 17 and the rotor disk 18 have a central receptacle 71 on the underside for an upper coupling element 22. A receptacle 71, open at the bottom, is designed to be hexagonal in the exemplary embodiment represented, so that it can receive the upper coupling element 22 represented in FIGS. 7a and 7b in a torque-proof connection and axially displaceable. In FIGS. 1 and 2, the upper coupling element 22 is in an upper release position, in which its tooth arrangement on the underside does not engage the corresponding tooth arrangement of a lower coupling element, also called engagement member 23. The upper coupling element 22 is prestressed against the engagement member 23 by means of a compression spring 74, so that in the course of rotation in the operating direction the torque of the upper coupling element 22 can be transmitted to the engagement member 23 by means of the positive connection between the meshing teeth of both coupling elements. Since in the exemplary embodiment represented only a revolution in the operating direction is desired, the coupling is provided with a one-directional free-wheeling device in the restoring direction, i.e. opposite the operating direction. As is known from other ratchet mechanisms, the teeth are inclined in opposite directions in respect to each other, so that the upper coupling element 22 can be pushed against the spring force of the spring 74 into the upper release position in the course of the restoring rotation of the cord pull, and the cutting unit 60 is stopped during the winding of the cord pull. In the course of the next pull on the handle 11, the upper coupling element 22 is rotated again into the operating position and again engages the engagement member 23, so that the latter can continue the rotating movement in the operating position. By means of the torque-derived connection, in the present case by means of the internal and external hexagonal device, between the reception opening on the underside of the engagement member 23 and the drive cam 69 on the top of the cutter shaft 67, the rotating movement is transmitted from the axial journal 17 of the secondary drive unit 102 to the cutting unit 60 in a 1:1 manner.

The base 21 of the top part 2 has a central circular opening, in which the substantially cylindrical engagement member 23 is rotatably seated in a well-fitting manner. Since the reception opening of the engagement member 23 is embodied as a blind hole, and the base does not otherwise include any openings, the areas of the top part 2 coming into contact with foodstuffs to be processed can be very thoroughly cleaned. In the peripheral area the base 21 is sealingly connected all around with the cover 20, so that food remnants or water are prevented from being able to penetrate into the interior space of the top part 2.

In the exemplary embodiment of FIG. 1, the base 21 is provided with a lateral wall 28 extending around the periphery, which has an exterior contour permitting the placement in a positively or non-positively connected manner on the container 30 for material to be cut. The clearance between the underside of the engagement member 23 and the bottom of the container 30 for material to be cut substantially corresponds to the height of the cutting unit 60 without its drive cam 69 at the top. Upper and lower seating of the cutting unit 60 is respectively embodied to be positively connected, or protected in such a way that no material to be cut can penetrate and become lodged. As indicated in FIG. 1, a slip-protection device 35 made of soft rubber or a silicone material has been applied to the underside of the container bottom 31. The vertical swirling ribs 34, evenly distributed over the circumference of the inner container wall, extend from the bottom 31 of the container as far as almost to the rotation height of the upper deflector wing 56. The function of the swirling ribs 34 in connection with cutting of peeling of vegetables or fruit is known and need not be further explained here.

The cutting unit 60 in the embodiment represented in FIG. 1 comprises cutters 61, 62, 63, or respectively blades 611, 621, 631 which are radially pivotable in respect to each other, such as extensively disclosed in CH Patent Application 00730/06. The respective devices are preferably devices for cutting vegetables, herbs and/or fruit and comprise at least two blades 611, 621, which are radially arranged on a common cutter shaft 64, at least one of which can be radially pivoted in relation to the other over a limited distance around the cutter shaft 64 from a position of rest into an operating position. On the one hand, for filling the container 30 for material to be cut, this pivotable mobility of the blades 621, 631 permits the placement of the blades 611, 621, 631, which are preferably arranged axially on top of each other and spaced apart, into a mutual radial position of rest, so that almost the entire container volume is available and can be filled. On the other hand, because of the pivotable mobility of the blades 621, 631 on the cutter shaft 64, the initial force requirement is considerably reduced in the starting phase, because not all blades 611, 621, 631 must cut simultaneous.

The basic principle of the novel drive can be transferred by one skilled in the art to a multitude of further devices, without deviating from the basic principle of the invention. Not only devices with one stationary and one or several blades can be produced, which are arranged pivotably movable on a cutter shaft, in which the blades are all preferable spaced apart from each other in the axial direction, but in further preferred embodiments it is also possible to arrange more than one blade on one blade holder, wherein these can again be positioned in the same angular position or offset from each other on the same angled holder. The geometry of the blades and their angle of attack at the blade holder will also be varied and optimized for the respective use. Since the cutting unit 60 of the devices in accordance with the invention can be very easily changed, it has been shown to be advantageous to offer different cutting or operating units. Besides the already described cutting units 60 for cutting vegetables and fruit, those with very narrow thin blades for cutting herbs and those with solid blades and serrated cutting edges for chopping ice are offered.

All components of the device which come into contact with the foodstuffs to be processed, except for the blades, and also the essential parts of the drive mechanism, are made from plastics, such as SAN (styrene acrylonitrile), POM (polyoxymethylene) and ABS (acrylonitrile butadiene styrene), by an extrusion process.

Those parts which come into contact with the foodstuffs to be processed in particular, are here approved for use with foodstuffs.

In preferred embodiments of the devices 1 in accordance with the instant invention, the diameter of the container 30 for the material to be cut lies between 120 and 140 mm at a height of 70 to 90 mm. Since the processing means of the preferred devices in accordance with the instant invention can be arranged in a space-saving manner in a common position of rest, and the lower deflector 50, arranged closely above the bottom, hardly takes up space, the usable free interior space of the container 30 for the material to be cut is only restricted by the central cutter shaft 67. In connection with the small, manually operated devices it is therefore already possible to insert whole onions, kohlrabi or fennel tubers. The fact that this large material to be cut can actually be processed by only a few pulls on the cord pull represents a further substantial advantage of the instant invention. Namely the pivotably-movable seating of at least one cutter blade 62, 63 results in the amount of force required at the start of each cutting movement, i.e. at the start of the pulling movement, being considerably reduced. When the cutting unit 60 is first operated after the container 30 for material to be cut has been filled by pulling on the handle 11, the lowermost blade 611, which is stationarily arranged on the blade holder 612 and the cutter shaft 67, cuts as soon as it encounters the material to be cut. The second blade 621, pivotably seated at a higher level, also encounters the material to be cut, but because of the inertia of the material to be cut in relation to the cutter shaft 67, it is pivoted out of its position of rest as far as into the operating position. In this phase the second blade 621 does not change its position in regard to the container 30 for the material to be cut and only starts to rotate once the operating position has been reached, i.e. as soon as the first stationary blade 611 has performed a 120° rotation in the container 30 for the material to be cut. As soon as the operating position has been reached, stops prevent the further pivoting of the movable cutter 62, and the blade 621 is suddenly put into motion and cuts the material to be cut resting against it, again aided by its inertia. Analogously, the second movable blade 631 only cuts when it has reached its end position after a pivot movement of 240°. In the starting phase, i.e. when pulling the pull cord 70 for the first time, the initial force requirement for this is considerably reduced, since not all blades 611, 621, 631 need to be cutting at the same time. Therefore the present invention is preferably employed with an above described cutting unit 60, since both act synergistically together, however, it is not limited to this.

In place of blades, finger-shaped processing means are employed for peeling onions and/or garlic, such as are known from devices in accordance with the species. Processing units for cutting and for squeezing are combined with each other in one unit for processing of soft or pre-cooked vegetables and/or fruit, in particular for preparing food for small children and babies.

The devices in accordance with the invention can be employed in many ways in the kitchen or household with further inserts which are arranged in the lower part 3 in place of the cutting unit 60 and can be put into rotation by means of the drive mechanism 10, for example a basket for centrifuging herbs, an S-shaped mixing arm, or a beater for frothing milk.

The container 30 for material to be cut which, in embodiments described up to now, had been shown to be substantially rotationally round and with its diameter slightly tapering downward, can also be simply exchanged and adapted to the respective purpose of use. A container 30 for the material to be processed and containing the finished processed material can be closed off by a separate cover and stored. To this end the cutting unit 60 or other processing insert is removed. With a second container 30 for material to be cut, the device in accordance with the invention is again ready for use.

Figure 5:
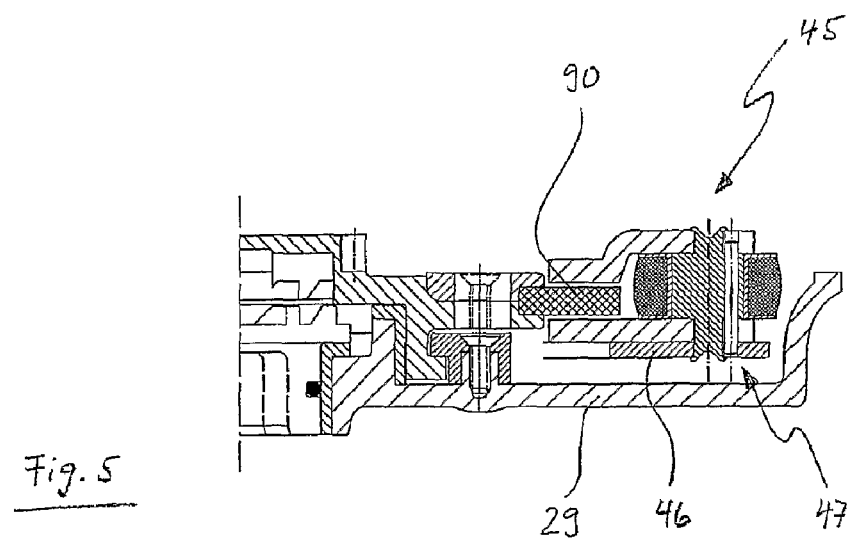

In a preferred embodiment of the present invention, not only is an operating means mechanically driven with every pull on the pull cord 70, but electrical current is additionally generated. It was represented in FIGS. 1 to 4 and already described above, that a rotor disk 18 is arranged below the axial journal 17. The rotor disk 18, which is considerably larger in diameter than the axial journal 17, has a peripheral magnetic ring 90 which, as represented in section in FIG. 5, drives a generator 45 in a contact-free manner. The generator 45 provides an electronic unit 47 with electrical current. Preferably the electronic unit 47 together with the generator 45 is arranged on a base plate 46, which can be rapidly and simply mounted on the bottom 29 of the base 21. Three illuminating means, particularly preferred in the form of LEDs, which are in operative connection with the display unit 40 via optical light guides, not represented in the drawing figure, are also arranged on the base plate 46. Use of the optical light guides permits the placement of the LEDs directly on the base plate 46 instead of in the display unit 40 in the cover 20, which considerably lowers the manufacturing costs. Electrical lines from the generator 45 to the display unit 40 in the cover 20 are omitted.

Figure 6:
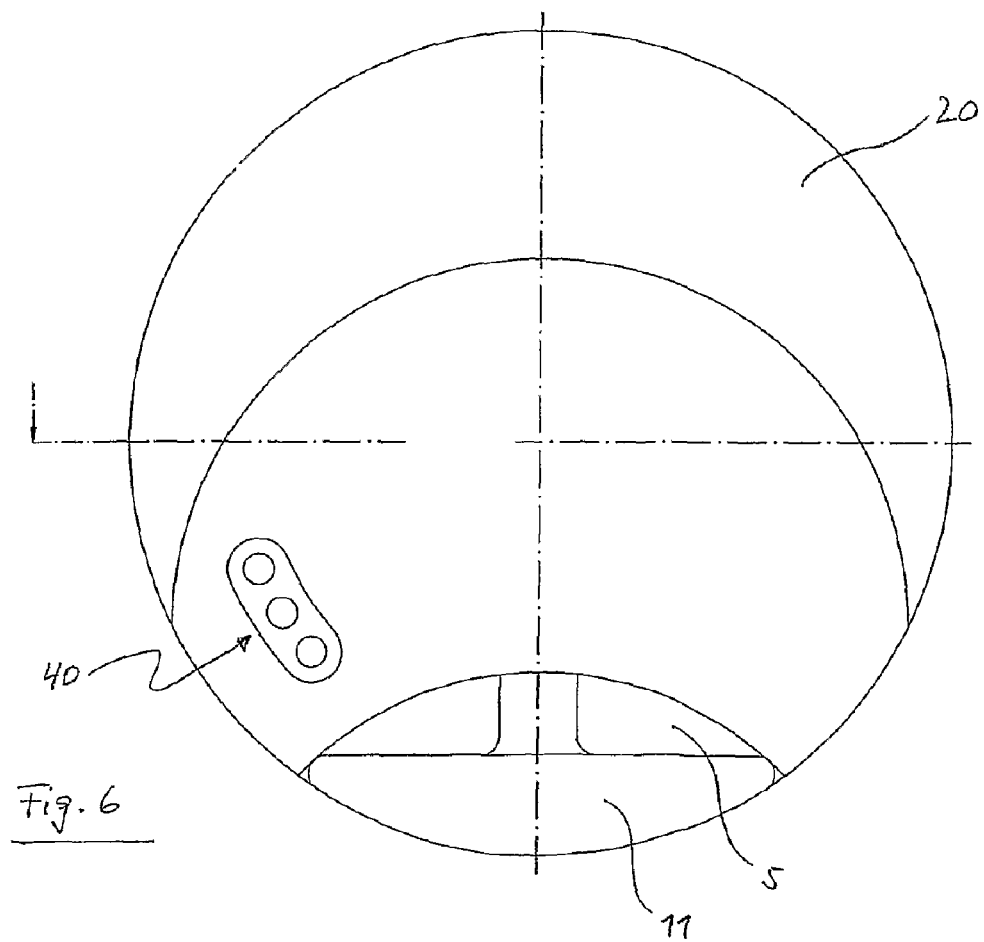

The electronic unit 47 and display unit 40 are components of a cutting degree indicator, which makes it easy even for untrained users to obtain cut material of an ideal degree of cutting. The display unit 40 can be well seen by the user, such as is represented in FIG. 6, for example. The cutting degree indicator, in particular its display unit 40, is very simply constructed and can be intuitively understood by the user without further instruction. Accordingly, in the exemplary embodiment of FIG. 6 a display unit 40, supplied by three light emitting diodes (LEDs) has been inserted into the cover 20, easily visible for the user. The three LED's have for example been selected in the colors green, yellow and red, and are arranged in a line next to each other. For detecting the number of revolutions of the processing unit, for example the cutting unit 60 and therefore of the blades 611, 621 and 631, the number of revolutions of the rotor wheel 18 is detected by the electronic device and stored intermediately. As soon as the intermediately stored value exceeds a preselected value (for example five revolutions), the green LED of the display is illuminated or blinks. It is indicated to the user by this that, although the material to be cut has been evenly comminuted, it is still rather coarse. The cutting unit 60 is further rotated by further pulls on the cord pull and, after exceeding a further predetermined number of revolutions, the display changes from green to yellow, and signals the user that now the material to be cut is present in a finely cut manner and, after a defined number of further pulls, the display changes into the red range. In this way the user is provided with the information that the material to be cut is now present in a very finely comminuted way and further processing would only result in finely pureed cut material. In a preferred exemplary embodiment, the display respectively changes at an even number of cord pulls (over the full length of the pull cord 70).

After the desired degree of fineness has been reached, the user stops and the cord 70 is rewound by means of the prewound restoring spring 72 until the handle 11 comes to rest again in the position of rest provided on the cover 20. The top part 2 can be removed from the container 60 for the material to be cut, and the finished material can be removed or stored in the container.

In the course of extensive tests it has been shown to be extremely advantageous for achieving a homogeneous cutting result to attach deflectors 50, 51 below and/or above the blades 611, 621, 631, which cause the material to be cut to be flung again and again within the range of the cutter blades.

In a sectional view, FIG. 8 shows a further embodiment of a top part 2' having an additional support element 200. This support element 200 prevents a deflection of the bearing journal 9', as well as of the interior and exterior hollow cylinder 82', 81' when a lateral force is introduced via the handle 11' and winder 12' into the primary drive unit 101' and therefore into the hollow wheel/drive wheel 14'. The support element is positioned in such a way that it projects away approximately radially from the hollow wheel/drive wheel 14' in the direction toward the feed-through opening 6' and therefore extends approximately parallel with the cord between the winder 12' and the feed-through opening 6'. The support element 200 is fastened on one or several mounting elements 210 with one or several holding means in the upper part 2'. The mounting element 210 is preferably formed on the cover 20'. Preferably the holding means is a screw, it is alternatively possible to fix the support element 200 in place by gluing, welding or snapping it in, for example. The support element 200 is preferably designed in such a way that on one side it supports the hollow wheel/drive wheel 14' on a sliding surface 201 and constitutes a sliding bearing together with it. The other side of the support element 200 can rest against the cover 20' with a support edge 202, which is preferably formed to correspond to the contour of the cover 20', and it constitutes a further abutment for the support element 200 in addition to the mounting element 210.

The support element 200 in accordance with the embodiment in FIG. 8 is shown in detail in FIGS. 9a to 9c. The support element 200 can be fastened through the two fastening holes 203 on the appropriate mounting elements 210, for example by means of screws. However, it is also conceivable that a different number of fastening holes is formed, and/or that alternative fastening methods are employed. Optionally, depressions 204 are provided on the underside of the support element 200, which permit, on the one hand, a reduction of the material required and, on the other hand, cause a structural reinforcement of the support element 200 by means of ribs formed between the depressions 204. The side of the support element 200 facing the hollow wheel/drive wheel 14', the so-called sliding surface 201, preferably has the same radius as the hollow wheel/drive wheel 14' itself. Alternatively, the sliding surface 201 is divided into at least two separate segments, so that the hollow wheel/drive wheel 14' only rests on individual points or sliding surface sections on the support element 200. A material which has a low coefficient of friction is preferably employed for producing the support element 200, for example a fluoropolymer such as PTFE is used. Alternatively, a multi-part support element 200 can be employed, in which only the sliding surface 201 consists of a material with a low coefficient of friction, or the support element can be provided with a coating. The side of the support element 200 located opposite the sliding surface 201, the support edge 202, is preferably embodied in such a way that it rests flat on the cover 20' and corresponds to the cover contour. In a further embodiment, the support element 200 can have positioning aids 205 for simplifying mounting which, with corresponding positioning receptacles, fit positioning receivers of the mounting element 201.

| List of Reference Numerals | |
|---|---|
| 1 | Device |
| 2, 2' | Top part |
| 3 | Lower part |
| 4 | Central shaft |
| 5 | Recess for handle |
| 6, 6' | Feed-through opening |
| 7 | Spring housing |
| 8 | Driveshaft |
| 9, 9' | Bearing journal |
| 10 | Drive mechanism |
| 101, 101' | Primary drive unit |
| 102 | Secondary drive unit |
| 11, 11' | Handle |
| 12, 12' | Winder/cord roll |
| 14, 14' | Hollow wheel/drive wheel |
| 15 | Internal tooth arrangement |
| 16 | External tooth arrangement |
| 17 | Axial journal |
| 18 | Rotor disk |
| 19 | Bearing bushing |
| 20, 20' | Cover |
| 21 | Base |
| 22 | Upper coupling element |
| 23 | Engagement member |
| 27 | Bearing washer |
| 28 | Lateral wall base |
| 29 | Bottom base |
| 30 | Processing container |
| 31 | Bottom |
| 32 | Lateral wall |
| 33 | Bearing journal |
| 34 | Swirling rib |
| 35 | Slip protection device |
| 40 | Display unit |
| 45 | Generator |
| 46 | Base plate |
| 47 | Electronic unit |
| 50 | Lower deflector |
| 51 | Upper deflector |
| 56 | Deflector wing |
| 60 | Cutting unit |
| 61 | First cutter |
| 611 | First blade |
| 612 | Second blade |
| 62 | Second cutter, first movable cutter |
| 621 | First blade holder |
| 622 | Second blade holder |
| 63 | Third cutter |
| 631 | Third blade |
| 632 | Third blade holder |
| 64 | Cutter axis |
| 67 | Cutter shaft |
| 69 | Drive cam |
| 70 | Pull cord |
| 71 | Receptacle |
| 72 | Restoring spring |
| 74 | Compression spring |
| 75 | Plug |
| 80 | Clamping ring |
| 81, 81' | Exterior hollow cylinder |
| 82, 82' | Interior hollow cylinder |
| 83 | Support elements |
| 84 | Support |
| 90 | Magnetic ring |
| 190 | Flange |
| 191 | Shaft cylinder |
| 192 | Hold-down device |
| 193 | Bearing sleeve |
| 200 | Support element |
| 201 | Sliding surface |
| 202 | Support edge |
| 203 | Fastening hole |
| 204 | Depression |
| 205 | Positioning aid |
| 210 | Mounting element |

What is claimed is:

1. A device for processing foodstuffs, comprising:
a top part, a drive mechanism and a bottom part with a processing container and a processing unit, which is manually operated by means of the drive mechanism and put into a rotating movement, wherein the drive mechanism comprises a cord pull drive, and the drive mechanism and the processing unit are in operative connection via a releasable torque-proof connection,
wherein the drive mechanism is further comprised of a primary and a secondary drive unit, which are in operative connection by means of a gear in such a way that a gear ratio of about 1:1.5 to 1:4 is achieved;
wherein the primary drive unit comprises:
a coaxially arranged spring housing, and
a winder, and
a drive wheel, and
the secondary drive unit comprises:
a coaxially arranged axial journal,
a rotor disk, and
a bearing bushing;
the primary drive unit and secondary drive unit positioned such that they do not share a common axis;
wherein, via an internal tooth arrangement of the drive wheel, the internal tooth arrangement including a plurality of teeth extending inward toward a central axis of the drive wheel, the primary drive unit is in direct contact with external teeth of the axial journal of the secondary drive unit.

2. The device in accordance with claim 1, wherein the primary and secondary drive units are arranged axis-parallel to each other.

3. The device in accordance with claim 1, wherein the secondary drive unit is arranged coaxially in relation to a central shaft of the device, and a driveshaft of the primary drive unit is arranged eccentrically thereto.

4. The device in accordance with claim 1, wherein at least one of the drive units intersects the axis of the respectively other drive unit.

5. The device in accordance with claim 1, wherein a bearing journal, which projects freely downward from a cover underside, supports the primary drive unit.

6. The device in accordance with claim 1, wherein the primary drive unit is arranged approximately horizontally in the upper part and in this position is supported on the inner cover wall.

7. The device in accordance with claim 1, wherein the axial journal and the rotor shaft have a central, hexagonal receptacle on an underside for the torque-proof connection reception of an axially displaceable upper coupling element, which can be brought from an upper free-wheeling position into a lower torque-connected engagement position with a lower engagement member for transmitting the rotary movement of the drive mechanism to the processing unit.

8. The device in accordance with claim 1, wherein a processing container is a substantially rotation-symmetrical vessel for receiving material to be processed, in which the drive unit is seated substantially coaxially rotatable, wherein the processing means are arranged radially in respect to the central axis.

9. The device in accordance with claim 1, wherein a support element supports the primary drive unit and absorbs the deflection force introduced to a bearing journal by the handle and the winder.

10. The device of claim 1, wherein the gear ration is about 1:1.8 to 1:1.9.

* * * * *

UNITED STATES PATENT AND TRADEMARK OFFICE
CERTIFICATE OF CORRECTION

PATENT NO. : 8,402,886 B2  Page 1 of 1
APPLICATION NO. : 12/299445
DATED : March 26, 2013
INVENTOR(S) : Bruno Herren It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this
First Day of September, 2015

Michelle K. Lee
*Director of the United States Patent and Trademark Office*